Aug. 26, 1969   F. K. COLLINS   3,463,500
MEANS FOR HOLDING AN ARTICLE HAVING AN OPEN CYLINDRICAL CAVITY
Filed Dec. 18, 1967
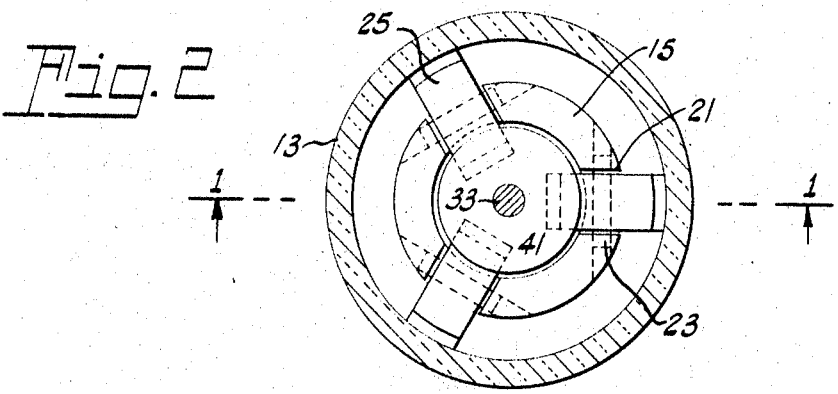
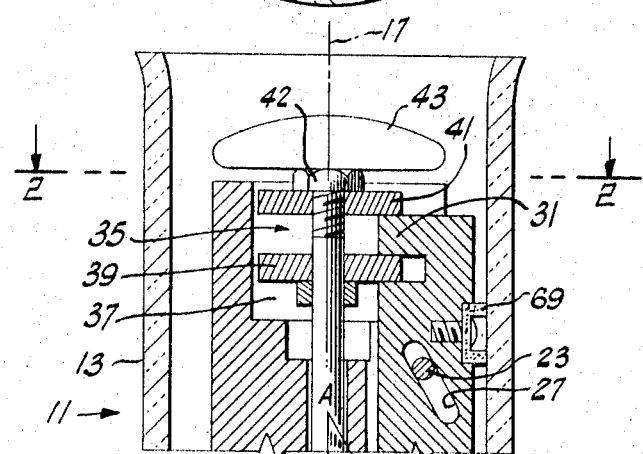
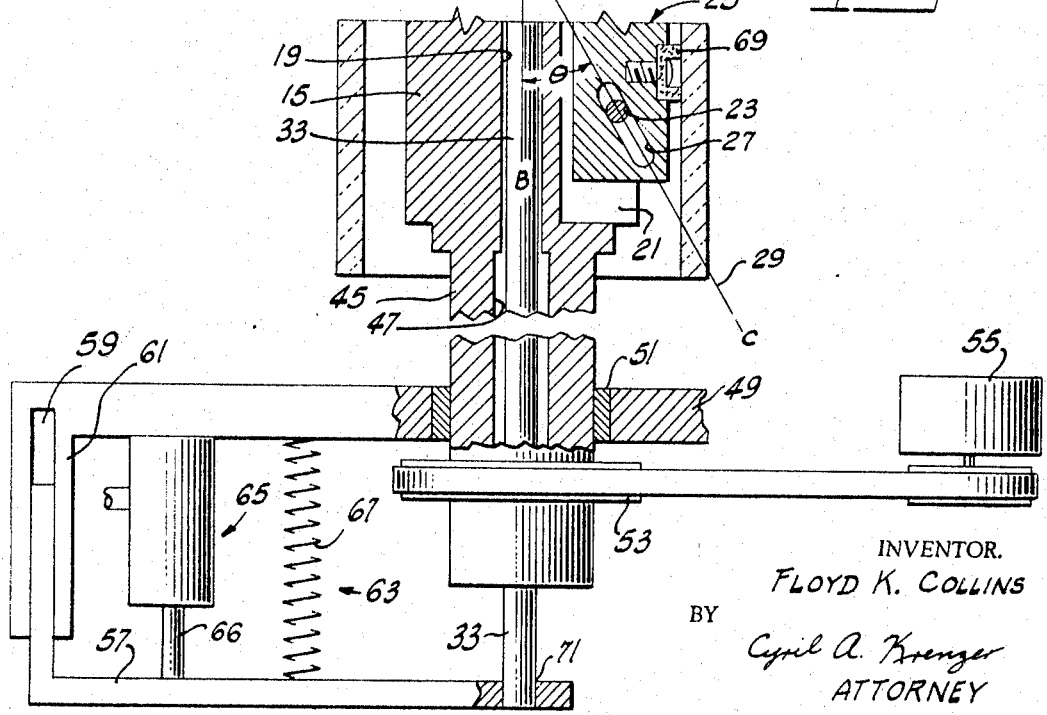
INVENTOR.
FLOYD K. COLLINS
BY
Cyril A. Krenzer
ATTORNEY United States Patent Office 3,463,500
Patented Aug. 26, 1969

3,463,500
MEANS FOR HOLDING AN ARTICLE HAVING AN OPEN CYLINDRICAL CAVITY
Floyd K. Collins, Ottawa, Ohio, assignor to Sylvania Electric Products Inc., a corporation of Delaware
Filed Dec. 18, 1967, Ser. No. 691,641
Int. Cl. B23b *31/40;* B22b *5/22*
U.S. Cl. 279—2                       7 Claims

ABSTRACT OF THE DISCLOSURE

Chuck means formed to interiorly align and support an article having an open cylindrical cavity, such as a tube or collet, has a body portion with a center bore therethrough and a plurality of radially-oriented spaced apart slots longitudinally formed therein and opening on the periphery thereof. Longitudinal jaws, formed to be slidable within the body slots, are movably retained therein by traverse pins in the body slots cooperating with angled keyway slots formed in the jaws. A shaft having predetermined longitudinal movement is oriented to slidably extend within the center bore. The movable shaft has means formed thereon to engage a portion of each jaw and effect uniform radially related movement to each jaw thereby providing accurate alignment and support of the article being held.

Background of the invention

Various kinds of chuck devices are conventionally utilized in lathe-type apparatus to hold articles having open cylindrical cavities, such as collets or lengths of tubing. In common usage, the chuck is intended to axially align and support the article in a positive manner, but such is not always achieved. Some chucks use two or more expanding members which are formed to effect cooperating arcuate contact and support to the internal cylindrical surface of the article. Since one or more resilient means are often employed to consummate movement of the several jaws in one direction, different tensions or forces exerted by the several resilient means frequently result in a non-uniformity of support or alignment. In addition, frictional factors within the structure of the chuck arrangement are often of a degree to override the intended advantages of the resilient means thereby aggravating misalignment of the several jaws.

Objects and summary of the invention

It is an object of the invention to reduce the aforementioned disadvantages and to provide an improved chuck means for interiorly aligning and supporting an article having an open cylindrical cavity.

Another object is to provide an improved chuck means having positive and uniform movement of the several jaw members to effect positive axial alignment of the article supported.

The foregoing objects are achieved in one aspect of the invention by the provision of an improved chuck means formed of a longitudinal body portion having an axial bore and a plurality of spaced apart longitudinal slots radially formed therein and opening on the periphery thereof. Each of the slots has at least one pin traversely oriented thereacross. Individual jaw members, formed to slidably fit within each of the longitudinal slots, contain at least one keyway slot formed in an angular manner relative to the axis of the chuck body. Each keyway slot is oriented relative to the respective traverse slot pin to facilitate sliding of the keyway slot on the pin thereby enabling radial movement of the jaw member. A shaft having predetermined longitudinal movement is oriented to slidably extend within the center bore of the chuck. Catch means formed on each jaw member cooperate with engagement means on the shaft to provide positive linkage whereby movement of the shaft provides uniform movement and positive alignment of all jaw members.

Brief description of the drawings

FIGURE 1 is a vertical sectional view taken along the line 1—1 of FIGURE 2 showing the improved chuck means supporting a collet article; and FIGURE 2 is a cross section of the chuck means taken along the line 2—2 of FIGURE 1.

Description of the preferred embodiment

For a better understanding of the present invention, together with other and further objects, advantages, and capabilities thereof, reference is made to the following specification and appended claims in connection with the aforedescribed drawings.

With reference to the drawings, there is shown in FIGURE 1 a vertical section of the chuck means 11 formed to provide alignment and support to an article having an open cylindrical cavity, as for example, collet member 13. The chuck means utilizes a longitudinal body portion 15 having an axis 17 and an axial or center bore 19; the axes of the chuck means and body portion being coincidental.

Formed in the body portion 15, as by machining, are a plurality of spaced apart longitudinal slots 21. As shown in the figures, these slots are radially formed and open on the periphery of the body portion. While three slots are shown, that number is not intended to be limiting. Each of the slots has at least one traverse pin oriented therein, but a plurality of pins can be utilized if desired. In the example shown and described herein, each of the slots has two spaced apart pins 23 traversely oriented therein and affixed in the body portion.

Individual jaw members 25, fashioned to slidably fit within each of the longitudinal slots 21, have for example, two keyway slots 27 formed therein in spaced relationship with pins 23. Each keyway slot is angularly oriented in a like manner with the axis 29 thereof forming an acute angle ($\angle\theta$) with the body axis 17 as per coordinates AB and AC. While the angular orientation of each of the keyway slots is shown with the apex A of the angle $\angle\theta$ as being toward the terminal end of the chuck means, angular orientation with the apex A in the opposite direction, toward the neck of the chuck, is also equally applicable. The keyway slots 27 are positioned with the pins 23 extending therethrough in substantially right angle relationship therewith; the keyway slots being of sufficient widths to facilitate sliding of the slots on the pins thereby facilitating confined radial movement of the jaw members 25. Each jaw member has a jaw catch means 31 such as a projection or hook-recess combination fashioned thereon in proximal relationship with the body axis 17.

Oriented to extend within the body bore 19 is a longitudinal shaft 33 formed to effect predetermined slidable movement therein. Shaft engagement means 35 are formed thereon in a manner to engage the jaw catch means 31 and impart positive and uniform longitudinal movement to each jaw member. As shown, the shaft engagement means 35 are formed as a substantially terminal structure on the shaft and spacedly oriented within an expanded terminal portion of the center bore 19 which is fashioned as an open cup 37 having an axial aperture in the bottom through which shaft 33 protrudes. The shaft engagement means 35 is formed by a pair of spaced apart apertured discs or washers 39 and 41. Of the pair, the first or lower disc 39 is affixed to the shaft 33, while the second or upper disc 41 is spaced thereabove on the shaft in an adjustable manner, as by threaded relationship. Lock nut means 42 facilitates adjustment of the upper disc 41 to provide sufficient clearance between the two cooperating engagement discs to adequately accommodate the several jaw catch projections 31 therebetween. Thus, activation linkage is provided for effecting positive movement of the plural jaw members. Terminal knob means 43 is fitted on the end of the shaft and is of a size to provide protection for the end of the chuck means. If desired, the knob can be integrated with the lock nut means 42 to facilitate adjustment thereof.

Integral with the chuck means body portion 15 is a neck portion 45 having an open center bore 47 extending longitudinally therethrough. The neck portion is formed to support the aforedescribed chuck means. As shown, the neck means is rotatably oriented on support frame 49 by bearing means 51. A pulley 53, attached to the neck portion and driven by motor means 55, provides rotational movement to the neck portion and chuck means 11, as desired.

The longitudinal shaft 33, oriented within the chuck means, extends through the open center bore 47 of the neck portion 45 and is attached to a movable support shelf 57 which is slidable in channel 59 of a bracket 61 associated with the support frame 49. Longitudinal movement of the shaft 33 is effected by shaft movement means 63 which in this instance comprises a reciprocation combination of an air cylinder 65 and a spring tension means 67. The shaft 33 can be either rotational or non-rotational. If rotation is desired, a bearing is employed at the shaft-shelf attachment contact 71.

As shown in the figures, a collect member 13 is aligned and supported by the chuck means 11. The jaw members 25 are radially extended to make holding contact with the interior surface of the collet. If desired, one or more contact pads 69 are attached to the jaw members to facilitate discrete contact relationship, as for example, when heated glass is supported. To effect the holding contact, the piston rod 66 of air cylinder 65 provides an outward pressure against support shelf 57 which results in a downward movement of shaft 33 effecting an outward radial movement of all jaw members. To release the collet member, the air cylinder is inactivated whereupon the spring tension means 67 retracts the shaft 33 thereby moving the jaw members radially inward.

While the shaft engagement means 35 are shown as being terminally positioned on the shaft 33, they can be oriented elsewhere on the shaft relative to the body portion with the jaw catch means 31 compatibly mated therewith.

Thus, there is provided an improved chuck means for holding an article having an open cylindrical cavity wherein the jaw members are uniformly activated to provide self-centering, optimum alignment and improved support of the article.

While there have been shown and described what are at present considered the preferred embodiments of the invention, it will be obvious to those skilled in the art that various changes and modifications may be made therein without departing from the scope of the invention as defined by the appended claims.

I claim:
1. Chuck means formed to hold an article having an open cylindrical cavity comprising:
   a longitudinal body portion having an axis and a center bore therein, said body having a plurality of spaced apart longitudinal slots radially formed therein and opening on the periphery thereof, each of said slots having at least one pin oriented traversely therein;
   a neck portion integral with said body portion and formed to have said open center bore extending longitudinally and axially therethrough;
   individual longitudinal jaw members formed to slidably fit within each of said longitudinal slots of said body portion, each of said jaw members having at least one keyway slot located angularly in relation to said body axis, said keyway slot being spaced in accordance to said traversely oriented pin and having a width to facilitate the sliding of said keyway slot on said pin to provide radial movement of each of said jaw members;
   jaw catch means formed on each of said jaw members proximal to said axis to provide activation linkage for the movement of said jaw members;
   a longitudinal shaft oriented to extend within said body bore and formed to have predetermined slidable movement therein;
   shaft engagement means formed on said shaft to engage said catch means on said jaw members to impart positive and uniform predetermined longitudinal movement to each of said jaw members;
   shaft movement means attached to said shaft to provide longitudinal movement thereto; and
   neck support means formed to operationally support said neck portion of said chuck means.

2. Chuck means according to claim 1 wherein each of said longitudinal slots has at least two spaced apart pins oriented traversely therein, and wherein each of said jaw members has at least two keyway slots located at substantially equal angles in relation to said body axis, said keyway slots being spaced apart in accordance to the spacing of said traversely oriented pins and having widths to facilitate the sliding of said keyway slots on said pins to provide radial movement of said jaw members.

3. Chuck means according to claim 2 wherein said neck support means is formed in a manner to facilitate rotational movement of said chuck portion and said chuck body portion integral therewith.

4. Chuck means according to claim 2 wherein said center bore in said body portion is an open bore extending the length thereof, and wherein said longitudinal shaft is of a length to extend through said bore.

5. Chuck means according to claim 4 wherein said center bore in said body portion has a terminal portion of expanded diameter formed as an open cup portion with an axial aperture in the bottom thereof, said shaft extending through said aperture and axially through said cup, said shaft being terminally fashioned within said cup portion to accommodate said shaft engagement means oriented thereon in the form of a pair of first and second spaced apart axially apertured discs, each of said jaw catch means being in the form of a projection extending from each jaw member and oriented in a radial manner between said shaft engagement discs.

6. Chuck means according to claim 5 wherein said first engagement disc is affixed to said shaft as a lower disc, and wherein said second engagement disc is an upper disc spaced from said lower disc with said jaw catch projections sandwiched therebetween, said upper disc being adjustable on said shaft to provide sufficient clearance between said engagement discs and said jaw catch projections to facilitate substantially radial sliding movements of said jaw catch projections relative to said discs.

7. Chuck means according to claim 3 wherein said longitudinal shaft and the engagement means thereon are non-rotational.

References Cited

UNITED STATES PATENTS

| | | | |
|---|---|---|---|
| 662,535 | 11/1900 | Jenkins | 279—60 XR |
| 2,174,866 | 10/1939 | Barnes | 279—60 XR |
| 2,699,338 | 1/1955 | Rue et al. | 279—2 |

ROBERT C. RIORDON, Primary Examiner

D. D. EVENSON, Assistant Examiner